Dec. 3, 1929.  L. HAWKINS  1,738,368
INCUBATOR
Filed Sept. 14, 1927   2 Sheets-Sheet 2
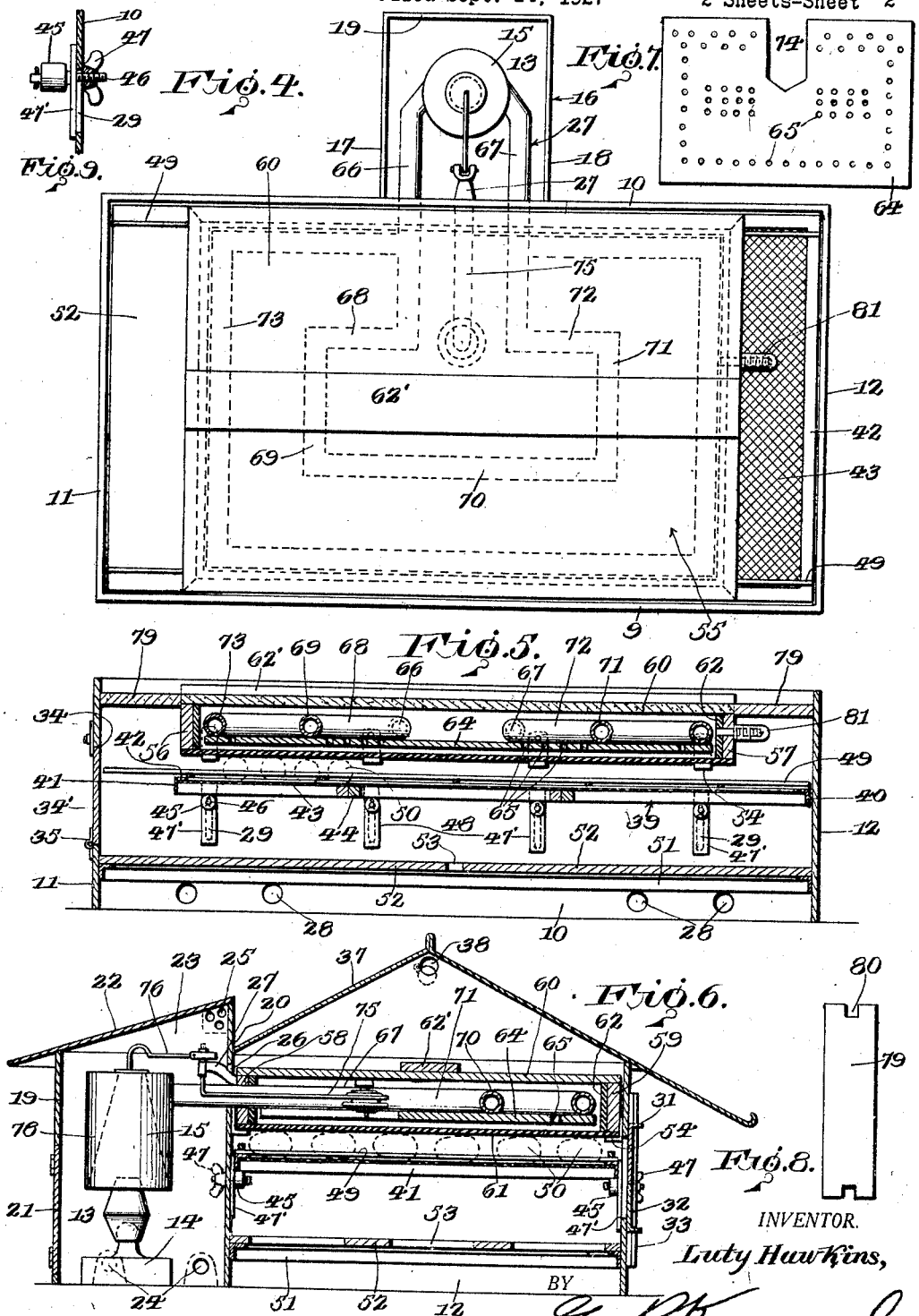
INVENTOR.
Luty Hawkins,
BY
Geo. P. Kimmel
ATTORNEY.

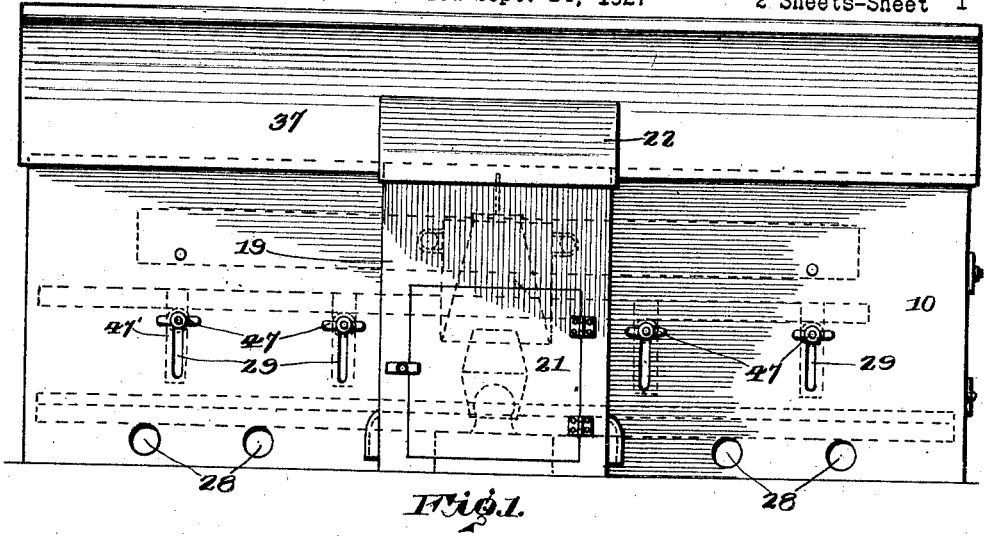
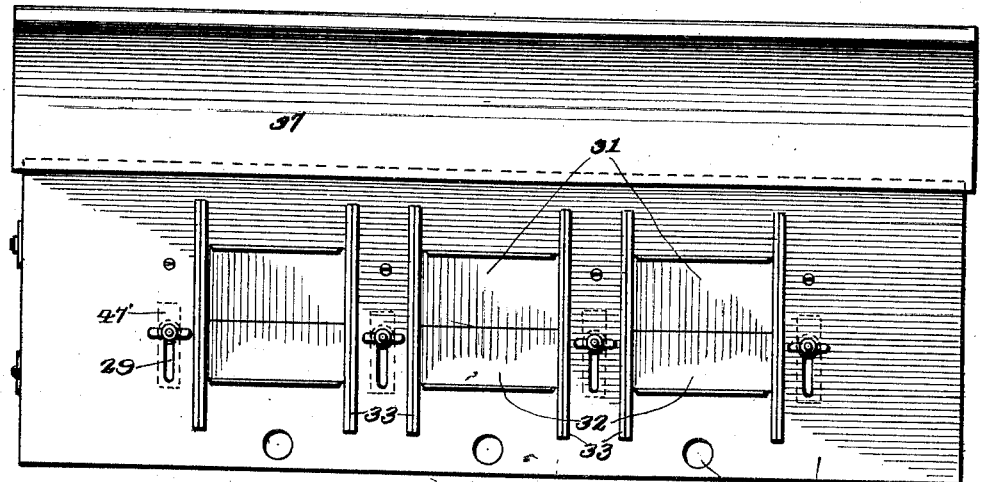
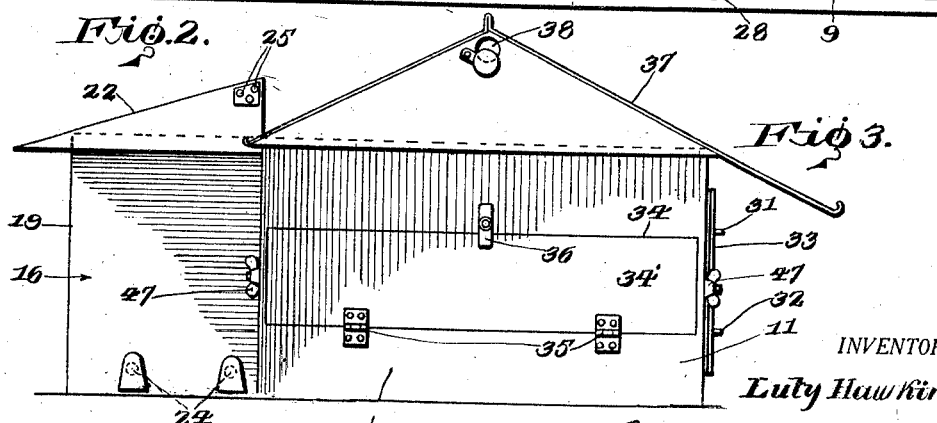

Patented Dec. 3, 1929

1,738,368

UNITED STATES PATENT OFFICE

LUTY HAWKINS, OF MOUNT VERNON, ILLINOIS

INCUBATOR

Application filed September 14, 1927. Serial No. 219,531.

This invention relates to an incubator, and has for its object to provide, in a manner as hereinafter set forth, a device of the class referred to with means contacting eggs for applying heat directly thereto, in a manner as when a hen is setting, thereby expediting the hatching and performing the incubating operation in accordance with the natural law.

A further object of the invention is to provide, in a manner as hereinafter set forth, an incubator having a vertically adjustable tray for supporting the eggs arranged below the heat applying element, and whereby the adjustable tray relative to the heat applying element will prevent the latter exerting too much pressure on the eggs.

A further object of the invention is to provide, in a manner as hereinafter set forth, an incubator and brooder with an egg contacting element.

A further object of the invention is to provide, in a manner as hereinafter set forth, an incubator and brooder which can be easily and quickly renovated, sterilized and cleaned when desired.

Further objects of the invention are to provide, in a manner as hereinafter set forth, an incubator which is comparatively simple in its construction and arrangement, strong, durable, compact, thoroughly efficient in its use, expeditious in its action, readily assembled, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a rear elevation of an incubator and brooder in accordance with this invention.

Figure 2 is a front elevation thereof.

Figure 3 is an end elevation thereof.

Figure 4 is a top plan view with the cover removed illustrating the contact element and egg holding tray.

Figure 5 is a longitudinal sectional view of the incubator with the cover removed.

Figure 6 is a cross sectional view of the incubator.

Figure 7 is a plan, upon a reduced scale, of the radiating member of the contact element.

Figure 8 is a plan view, upon a reduced scale, of a combined ventilator and closure.

Figure 9 is a detail illustrating one of the adjustable supports for the egg tray.

An incubator in accordance with this invention, includes a housing of appropriate height and preferably of rectangular contour and which includes a front wall 9, a rear wall 10, and a pair of end walls 11, 12. Connected to and projecting rearwardly from the rear wall 10, centrally thereof, is a wall forming member, of U-shape in plan, and which in connection with the wall 10, provides a chamber 13 for a heating device 14 for a hot water heater 15. The wall forming member, referred to generally at 16, provides a pair of side walls 17, 18 and a rear wall 19. The front wall of the chamber 13 is provided by the wall 10 and the latter centrally thereof is formed with an extension 20 of appropriate height. The rear wall 19 of the chamber 13 has a door 21 so that access can be had to the chamber 13. Mounted upon the extension 20 and the walls 17, 18 and 19 is a roof member 22 which inclines downwardly from the extension 20 to the rear wall 19 of the chamber 13. The roof structure or member 22 includes side pieces 23 of triangular contour and these seat on the top edges of the walls 17, 18. The sides of the chamber 13, are provided with lower ventilators 24 and upper ventilators 25. The wall 10, below the extension 20 is provided with a rectangular slot 26 for the passage of a water circulating pipe, referred to generally at 27 and which will be hereinafter more fully referred to.

The front wall 9 of the housing, as well as the rear wall 10, is provided at the lower end thereof with a plurality of spaced air inlet openings 28. Each of said walls is furthermore formed, a substantial distance above the opening 28 with a series of spaced, vertically disposed slots 29 and with the slots in one wall aligning with the slots in the other wall. The slots 29 are of appropriate length. The wall 9 is formed with a series of spaced, vertically disposed rectangular openings 30 forming door openings each of which is closed by a pair of oppositely movable vertically slidable normally abutting doors 31, 32 and with each pair of doors slidably mounted in a pair of spaced guides 33. The sliding doors 31 and 32 are closed during incubation. After the hatch the top door is raised and a brooding platform, not shown, is put in place even with the top of the egg tray, to be presently referred to, and touching it through the doors.

Then the lower doors must be lowered accordingly. The edge of the platform that is attached to the egg tray is lowered with it. The upper doors are lowered at night. It is not necessary to remove the platform as the lower doors are against the bottom of it and the top doors will slide down against the top of it. The end wall 11 is formed with a lengthwise extending rectangular door opening 34 and a door 34', hinged as at 35 and said door 34' is maintained in position to close the opening 34 by a latch 36. The purpose of the door opening 34 will be presently referred to. A roof element 37 formed of two oppositely extending, downwardly inclined portions and a pair of triangular end portions is provided for the housing and each of the end portions of said roof element is provided with a ventilator 38. One of the downwardly inclined portions of the roof element is of materially greater width than the other portion and projects outwardly from the end portions of the roof element and overhangs, as well as projects outwardly from the end portions of the roof element and overhangs, as well as projects from the front wall 9 of the main housing.

A supporting tray for the eggs or chicks, is indicated generally at 39, and it is formed of a rectangular frame 40, and each side end member of the frame is of angle shape in cross section to provide the frame with a vertical leg 41 and a horizontally disposed leg 42, which extends inwardly at right angles from the upper end of the leg 41. Secured against the lower face of the leg 42 and coextensive therewith, is a faraminous member, panel or support 43 of a length to abut against the inner face of the leg 41. The leg 42 forms a ridge or bead entirely surrounding the marginal portion of the upper face of the foraminous member or panel 43.

Connected to the sides of the frame 42 are transversely extending brace members 44 therefor, and which also provide spaced supports for the formanious sheet or panel 43.

The length of the tray 39 is about six inches less than the length of the housing to permit of the shifting of the tray when desired. The frame 40 is mounted on rollers 45, carried by vertically adjustable bolts 46, which extend through the slots 29. The inner ends of the bolts form bearings for the rollers 45, and the outer ends thereof carry wing nuts 47, which bind against the outer faces of the walls 9, and 10 and clamp the bolts 46 in adjusted position. Mounted on the bolts 46, inwardly of the walls 9, 10 are closure strips or plates 47' for the slots 29. The strips 47' bear against the inner faces of the walls 9, 10 are of greater length than the slots 29 and prevent free passage of air through the slots. The bolts 46 extend through the strips 47' intermediate the ends of these latter. The strips are carried with the bolts. The bolts or bearings 46 are vertically adjustable whereby the tray 39 can be adjustably positioned, vertically, within the incubating chamber 48 provided by the housing. Arranged upon the tray 39, and supported by the ledge 42, is a removable egg shifting device 49 of skeleton form and which extends from one end to the other end of the housing. In Figure 5 the eggs are shown in dotted lines and indicated at 50 and they are mounted, on the foraminous sheet or panel 43 and engaged by the shifting device 49 and turned the desired extent, as the device 49 is not bodily carried with the tray when the latter is shifted on the rollers 45. The shifting device 49 for the eggs is removed after the chicks are hatched, and a suitable means, not shown, is placed on end of egg tray to prevent chicks from tumbling off.

Secured to the inner faces of the front, rear and end walls of the housing, directly above the openings 48, is a supporting frame 51 for the removable bottom 52 of the chamber 48. The bottom 52 is formed of insulation material and provided at its transverse median with a series of spaced slots 53 for free passage of air into the chamber 48. The bottom 52 is removable through the door opening 34. The bottom member 52 is arranged a substantial distance below the rollers 45, and is removed when chicks are about two days old and straw may be placed below the egg tray on the ground for sanitary purposes.

Secured to the inner faces of the front and rear walls 9, 10, of the housing, are supporting brackets 54 for the contact element referred to generally by the reference character 55, and the latter is of rectangular contour, but of less length than the length of the housing, as well as being of less length than the length of the supporting tray 39. The contact element 55 comprises a pair of end walls 56, 57 and a pair of side walls 58, 59, and a top 60. The side and end walls and top 60 are suitably secured together and preferably are constructed of wood, but can be set up of any suitable material. The contact element 55 also includes a resilient bottom 61 formed of impervious material, preferably of sheet rubber, and which constitutes a contact member and is secured against the bottom edges of the side and end walls of said element 55. The side and end walls of the element 55 are provided with linings 62 of insulation material. Extending across the top 6, as well as being pivotally secured therewith, is a brace piece 62'. Arranged within the chamber 63 formed by the side and end walls and top and bottom members of the element 55 is a heat radiating member 64 formed of metallic material and which is spaced a substantial distance above the resilient contact member 61. The heat radiating member 64 is provided with perforations 65. The slot 26 in the rear wall 10 of the housing opposes the side wall 58 of the element 55.

The water circulating pipe 27, which is of appropriate diameter, for conducting the water from the water heater 15 into and around the chamber 63 and thence to the heater 15 includes a pair of opposed parts 66, 67 which extend in a transverse direction with respect to the housing and pass through the slot 26 and also through the side wall 58 of the member 55. The part 66 terminates in a right angularly disposed outwardly extending part 68 and the latter terminates in a part 69, disposed at right angles with respect to the part 68 and extending towards the side wall 59 of the element 55. The part 69 terminates in one end of a part 70 disposed longitudinally with respect to the element 55 and which terminates in a rearwardly extending angularly disposed part 71, merging into a part 72 which extends inwardly from the part 71 and is disposed at right angles with respect thereto and said part 72 merges into the part 67. Communicating with parts 66, 67, in proximity to the wall 58, but inwardly with respect thereto, is a rectangular branch 73. The parts 68, 69, 70, 71 and 72 provide the pipe 27 with a rectangular portion disposed centrally of the chamber 63 and which is surrounded by the rectangular branch 73, and the latter is arranged in proximity to the side and end walls of the element 55. The radiating member 64 is secured to the bottom of the parts 66 to 72 inclusive and also secured to the bottom of the rectangular branch 73. The openings 65 formed in the heat radiating member 64 are not closed by the circulating pipe and the branch 73 and provides means for circulation of air from below or above the member 64 and from above to below said member. The radiating member 64 has a cutout portion 74 which is arranged between the parts 66, 67 of the circulating pipe or line 27 and arranged in the space formed by said cutout portion is a thermostatic element 75, for operating a damper 76. The element 75 is connected to the damper 76 and is mounted in a supporting arm 77. The water heater or boiler is formed with an opening 78 which gradually decreases in diameter from the bottom to the top of said element and the heating element 14 extends into the lower end of said element. The damper 76 controls the discharge of heat through the passage 78. The damper 76 operates upon the upper end of the boiler or heater 15

The contact member 61 of the element 55, is to be in direct contact with the eggs 50 and in this connection see Figures 5 and 6. The contact member 61 is heated from the element 64 by radiation, and the element 64 is heated by the circulation of hot water through the pipe or line 27 and branch 73. Although the member 64 is illustrated as being heated from the circulation of hot water through the pipe or line 27 and branch 73, it is to be understood that any suitable means can be employed for heating said member 64. The thermostatic element 75 extends through the side wall 58 of the element 55. The parts 66 and 67 of the circulating pipe 27, as well as the thermostatic element 75, also extend through the insulation lining for the wall 58.

The space between the ends of the element 75 and the end walls 11, 12, of the housing is closed by plates 79 of insulation material provided with openings 80 at each end for ventilating purposes. The plates 79 are suitably connected to the end walls 11, 12 and the ends of the contact element 75.

Although the water circulating pipe 27 is provided with a rectangular portion, yet it is to be understood that it can be formed in any suitable manner and further that the branch 73 can be of any suitable contour. The branch 73 is so set up as to receive the hot water from the part 66 and the water will pass through the branch 73 to the part 67 and from there it will be conducted to the water heater or boiler 15.

The heating of the air within the chamber 63, from the pipe 27 and branch 73, as well as the plate 64, also assists in the heating of the flexible contact member 61. The heating chamber 63 is provided with a thermometer 81 which extends from one of the end walls of the element 55 and is arranged below the closure 79, see Figure 5. The plates 79 are mounted in a manner whereby they can be removed when occasion requires.

Although the pipe 27 is employed for conducting hot water, it is obvious that hot air could be used instead of water.

The eggs and chick remain on the tray 39 and are confined therein by the shifting device 59, as the latter is of skeleton form, and consists of spaced longitudinal transverse bars connected together and in this particular, see Figure 5.

The member 64 distributes the heat evenly with respect to the flexible contact member 61 and an efficient heating of the eggs carried by the tray is had, and owing to the direct contact of the member 61 with the eggs the heat is applied directly thereto and in a manner as when a hen is setting, thereby expediting the hatching and conforming incubation operation in accordance with the natural law.

It is thought the many advantages of an incubator, in accordance with this invention, can be readily understood, and although the preferred embodiment of the invention is as illustrated and described, yet it is to be understood that changes in the details of construction can be had which will fall within the scope of the invention as claimed.

What I claim is:

1. An incubator comprising a housing, a roof therefor, a sloted plate of insulation supported within the housing above the bottom thereof, said housing below said plate provided with openings, a contact element suspended within the housing, an egg supporting tray shiftably supported within the housing between said element and plate, closure plates interposed between said element and housing and having ventilating openings, and said roof having ventilating means.

2. In an incubator, an egg tray comprising a frame member formed with a vertical leg for seating on a set of rollers and further formed with a horizontal leg extending inwardly from the upper end of the vertical leg for supporting an egg shifting element, and a foraminous member secured to the lower face of said horizontal leg to provide a support for eggs in spaced relation to the shifting element, said horizontal leg providing a continuous, elevated border on the upper face of said foraminous member.

3. In an incubator, a housing formed in opposite sides thereof with vertical slots, a horizontally disposed shaft extending through each slot into the housing and slidable therein in a vertical direction, horizontally disposed rollers carried by the inner ends of said shafts for adjustably supporting an egg tray within the housing, and locking members on the outer ends of said shafts for coaction with the outer face of said housing to maintain the shafts against vertical movement.

In testimony whereof, I affix my signature hereto.

LUTY HAWKINS.